United States Patent
Saje et al.

(10) Patent No.: US 9,050,933 B2
(45) Date of Patent: Jun. 9, 2015

(54) MASS OPTIMIZED EXTRUSIONS, ASSEMBLIES INCLUDING THE SAME AND METHODS OF MAKING AND USING THE SAME

(71) Applicant: GM Global Technology Operations LLC, Detroit, MI (US)

(72) Inventors: Robert N. Saje, Shelby Township, MI (US); John C. Johnson, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 62 days.

(21) Appl. No.: 13/930,917

(22) Filed: Jun. 28, 2013

(65) Prior Publication Data

US 2015/0004342 A1  Jan. 1, 2015

(51) Int. Cl.
*B62D 25/08* (2006.01)
*B62D 21/03* (2006.01)
*B60R 13/02* (2006.01)
*B32B 7/08* (2006.01)

(52) U.S. Cl.
CPC . *B60R 13/02* (2013.01); *B32B 7/08* (2013.01); *Y10T 428/139* (2015.01); *Y10T 428/24479* (2015.01); *Y10T 428/1352* (2015.01); *Y10T 428/24322* (2015.01); *B62D 21/03* (2013.01); *B62D 25/08* (2013.01)

(58) Field of Classification Search
CPC ....... B62D 25/08; B62D 25/087; B62D 21/03
USPC .......... 296/187.01, 193.01, 193.02, 296/203.01–203.04, 205, 66
See application file for complete search history.

(56) References Cited

U.S. PATENT DOCUMENTS

| | | | |
|---|---|---|---|
| 4,826,238 A * | 5/1989 | Misono et al. | 296/209 |
| 5,338,080 A * | 8/1994 | Janotik et al. | 296/29 |
| 5,868,457 A * | 2/1999 | Kitagawa | 296/187.09 |
| 6,357,822 B1 * | 3/2002 | Panoz et al. | 296/209 |
| 6,644,722 B2 * | 11/2003 | Cooper | 296/187.02 |
| 6,672,654 B2 * | 1/2004 | Yamada et al. | 296/205 |
| 6,915,617 B2 * | 7/2005 | Nees et al. | 296/202 |
| 7,234,763 B2 * | 6/2007 | Gupta et al. | 296/208 |
| 7,661,744 B2 * | 2/2010 | Maruno et al. | 296/65.16 |
| 8,651,565 B2 * | 2/2014 | Zornack et al. | 296/205 |
| 8,857,040 B2 * | 10/2014 | Freis | 29/525.11 |
| 2003/0067190 A1 * | 4/2003 | Dancasius et al. | 296/187 |
| 2010/0275669 A1 * | 11/2010 | Vollet et al. | 72/324 |

* cited by examiner

*Primary Examiner* — Gregory Blankenship
(74) *Attorney, Agent, or Firm* — BrooksGroup

(57) ABSTRACT

A number of variations may include a product including an extrusion having an extruded profile including a first section having a first thickness and a second section having a second thickness wherein the second thickness is greater than the first thickness.

19 Claims, 2 Drawing Sheets

MASS OPTIMIZED EXTRUSIONS, ASSEMBLIES INCLUDING THE SAME AND METHODS OF MAKING AND USING THE SAME

TECHNICAL FIELD

The field to which the disclosure generally relates to includes extrusions for vehicles.

BACKGROUND

Vehicles may be equipped with extruded components.

SUMMARY OF ILLUSTRATIVE VARIATIONS

A number of variations may include a product including an extrusion having an extruded profile including a first section having a first thickness and a second section having a second thickness wherein the second thickness is greater than the first thickness.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
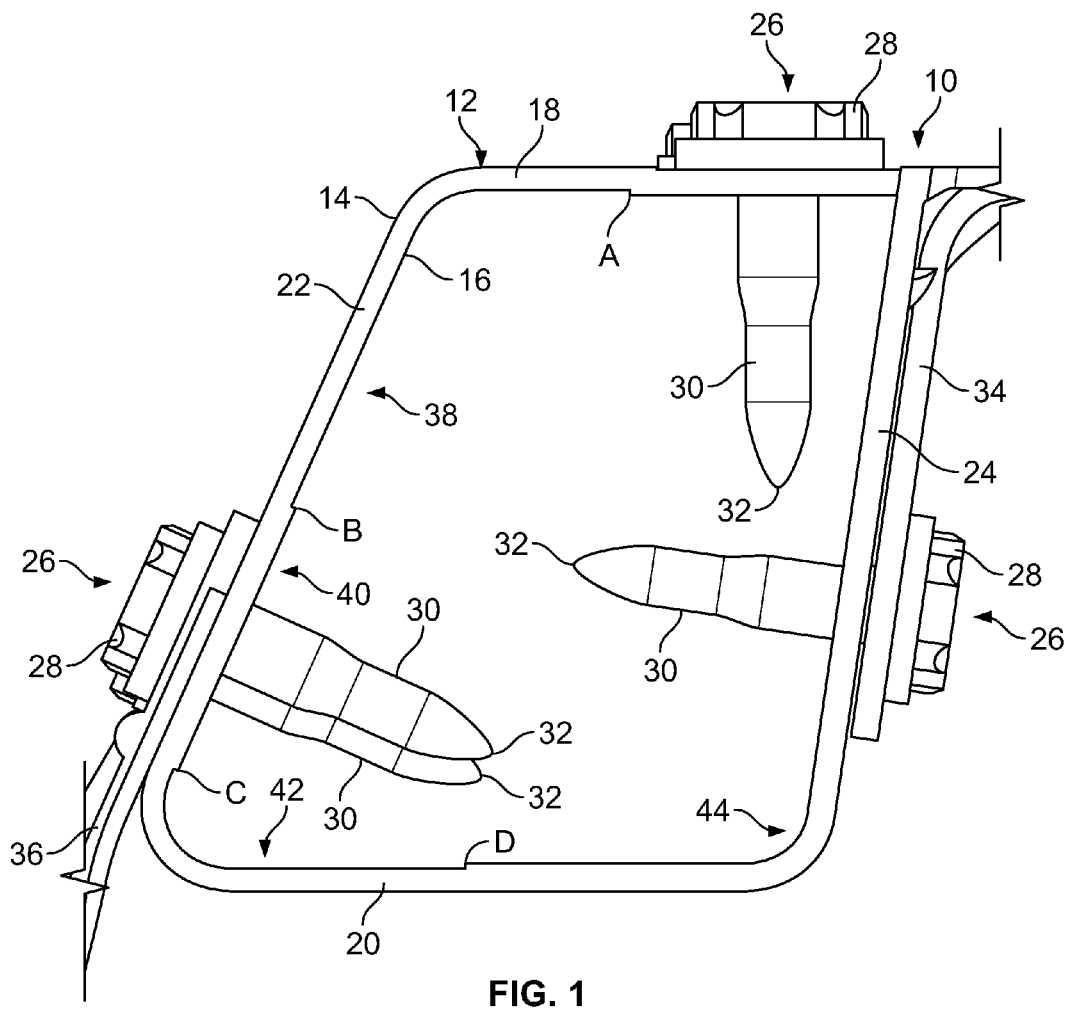
FIG. 1 is a sectional view of a product which may include an extrusion having an extruded profile having a first section having a first thickness and a second section having a section thickness and wherein the second thickness is greater than the first thickness according to a number of variations.
Figure 2:
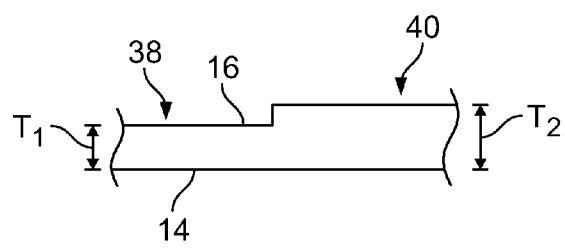
FIG. 2 is an enlarged sectional view with portions removed of an extrusion including a first section having a first thickness and a second section having a second thickness and wherein the second thickness is greater than the first thickness according to a number of variations.

Referring now to FIGS. 1-2, a number of variations may include a product 10 which may include an extrusion 12. The extrusion 12 may have an extruded profile (cross-sectional profile) with one or more locally thickened sections. The extrusion 12 may include an outer surface 14 and an opposite inner surface 16. The extrusion 12 may be configured in a number of ways. In a number of variations, the extrusion 12 may have a generally tubular cross-sectional shape and may include a top wall portion 18 and an opposite bottom wall portion 20, a first side wall portion 22 and an opposite side wall portion 24. The extrusion 12 may be a single piece, non-joined structure having a single material. In a number of variations, the extrusion 12 may include aluminum, such as but not limited to, an aluminum alloy.

In a number of variations the extrusion 12 may include a first section 38 which may have a first thickness T1. The extrusion 12 may have a second section 40 having a thickness T2 and wherein the first section 38 joins the second section 40. The second thickness T2 may be greater than the first thickness T1. In a number of variations the first thickness T1 may be 1.5 mm or greater, for example but not limited to 1.5-1.99 mm, and the second thickness T2 may be 2.0 mm or greater. Similarly, the extrusion 12 may have a third section 42 joining the second section 40 and wherein the third section 42 has a thickness similar to or the same as the first section 38. The extrusion 12 may include a fourth section 44 having a thickness similar to or the same as the second section 40 and wherein the third section 42 joins the fourth section 44. In a number of variations the extrusion 12 may be an elongated tube or beam and may have a generally tubular cross-section. The second section and fourth sections may have a second thickness T2 which is greater the first thickness T1 of the first section and third section extending in the axial direction of the generally tubular shape extrusion 12.

Figure 4:
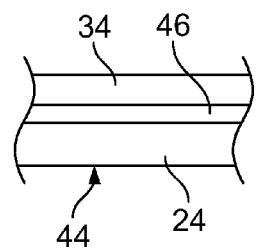
FIG. 4 is a partial, sectional view illustrating a product a first sheet of material adhered to a thickened section of an extrusion according to a number of variations.

The product 10 may further include a flow drill screw 26 screwed through the thicker sections such as the second section 40 and fourth section 44 of the extrusion 12. A first sheet 34 of a different material, for example steel, may be secured to the extrusion 12 by a flow drill screw 26 extending through both the first sheet 34 and the extrusion. The flow drill screw may include a head portion 28 connected to a shaft 30 having a pointed end 32. If desired, an adhesive 46 may be interposed between the first sheet 34 and a thicker section 44 of a wall section 24 of the extrusion 12 (best seen in FIG. 4). Similarly a second sheet 38 which may be the same or different material than the first sheet 34 may be secured to the extrusion 12 by way of a flow drill screw 26 extending through the second sheet 36 and the extrusion 12. An adhesive layer 46 may be also interposed between the second sheet 36 and the extrusion 12.

Because the extrusion 12 includes an extruded profile with locally thickened sections, for example sections 40 and 44, the mass of the extrusion 12 can be reduced compared to utilizing an extrusion having a uniform thickness of 2.0 mm or greater which would be necessary to secure, via flow drill screws, structural components such as the first sheet 34 and second sheet 36.

Figure 3:
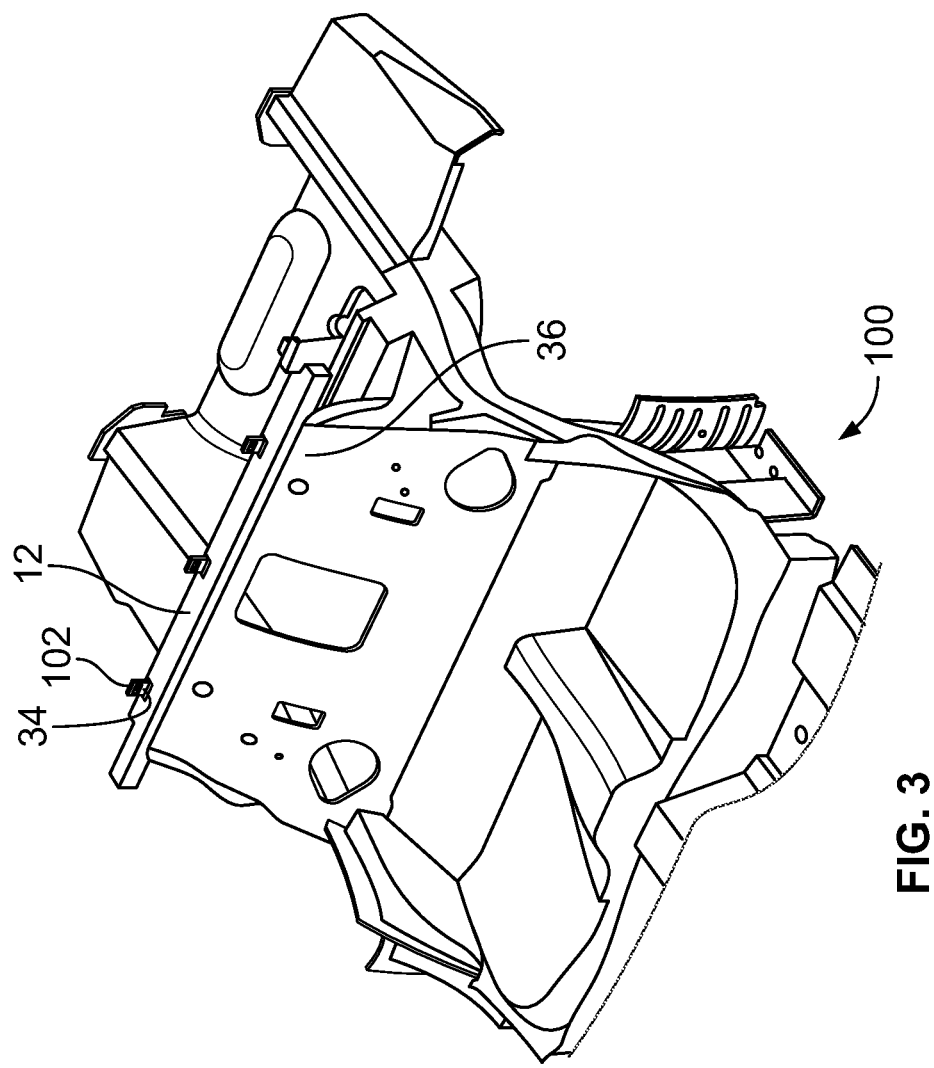
FIG. 3 illustrates a product including an extrusion according to a number of variations.

In a number of variations, the extrusion 12 may be a vehicle seat back beam attached to a seat back panel of a vehicle underbody 100. In a number of variations, sheet 32 may provide attachment features, such as through holes 102 formed therein for interior trim components and sheet 36 may provide a seat back structural panel (best seen in FIG. 3).

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a vehicle structural component comprising an extrusion having a first section having a first thickness and a second section having a second thickness and wherein the second thickness is greater than the first thickness.

Variation 2 may include a product as set forth in Variation 1 wherein the first thickness is 1.5 mm or greater and wherein the second thickness is 2.0 mm or greater.

Variation 3 may include a product as set forth in any of Variations 1-2 wherein the extrusion has a generally tubular shape.

Variation 4 may include a product as set forth in any of Variations 1-3 wherein the extrusion includes a top wall portion and an opposite bottom wall portion, a first side wall portion and an opposite second side wall portion wherein the wall portions are connected together.

Variation 5 may include a product as set forth in any of Variations 1-4 further comprising a flow drill screw extending through the second section of the extrusion.

Variation 6 may include a product as set forth in any of Variations 1-5 further comprising a first sheet of material and a flow drill screw extending through the first sheet and the extrusion.

Variation 7 may include a product as set forth in any of Variations 1-6 further comprising a first sheet of material adhered to the extrusion with an adhesive layer positioned there between and a flow drill screw extending through the first sheet, adhesive layer and the extrusion.

Variation 8 may include a product as set forth in any of Variations 1-7 wherein the second section extends in the axial direction of the generally tubular shaped extrusion.

Variation 9 may include a product as set forth in any of Variations 1-8 wherein the extrusion has a generally tubular shape including a top wall portion and an opposite bottom wall portion, a first side wall portion and an opposite second side wall portion, wherein the second section is part of a first side wall portion, and the extrusion including a third section having a third thickness and a fourth section having a fourth thickness, and wherein the fourth thickness is greater than the third thickness and wherein the fourth section is part of the second side wall portion, and further comprising a first sheet having a portion positioned overlying the fourth section and a flow drill screw extending through the first sheet and the fourth section, and a second sheet overlying the second section and a flow drill screw extending through the second sheet and the second section.

Variation 10 may include a product as set forth in any of Variations 1-9 wherein each of the first section and third section has a thickness of 1.5 mm or greater and wherein each of the second section and fourth section has a thickness of 2.0 mm or greater.

Variation 11 may include a product as set forth in any of Variations 1-10 further comprising an adhesive layer interposed between the first sheet and the fourth section, and an adhesive layer interposed between the second sheet and the second section.

Variation 12 may include a product as set forth in any of Variations 1-11 wherein the extrusion is a vehicle seat back beam.

Variation 13 may include a product as set forth in any of Variations 1-12 wherein the second sheet is a vehicle seat back panel.

Variation 14 may include a product as set forth in any of Variations 1-13 wherein the first sheet is constructed and arranged provide an interior trim component.

Variation 15 may include a method comprising: providing a product comprising: a vehicle structural component comprising an extrusion having a first section having a first thickness and a second section having a second thickness and wherein the second thickness is greater than the first thickness; attaching a first sheet of material to the extrusion comprising inserting a flow drill screw through the second sheet of material and the first section.

Variation 16 may include a product as set forth in Variation 15 further comprising adhering the first sheet of material to the extrusion with a layer of adhesive prior to the inserting the flow drill screw through the second sheet of material and the first section.

Variation 17 may include a product as set forth in any of Variations 15-16 wherein extrusion further includes a third section having a third thickness and a fourth section having a fourth thickness and wherein the fourth thickness is greater than the third thickness, and further comprising attaching a second sheet of material to the extrusion comprising inserting a flow drill screw through the second sheet of material and the fourth section.

Variation 18 may include a product as set forth in any of Variations 15-17 wherein the extrusion is a vehicle seat back beam.

Variation 19 may include a product as set forth in any of Variations 15-19 the second sheet is a vehicle seat back panel.

Variation 20 may include a product as set forth in any of Variations 15-19 wherein the first sheet is constructed and arranged to provide an interior trim component.

The above description of select variations within the scope of the invention is merely illustrative in nature and, thus, variations or variants thereof are not to be regarded as a departure from the spirit and scope of the invention.

What is claimed is:

1. A product comprising:
   a vehicle structural component comprising an extrusion having a first section having a first thickness and a second section having a second thickness and wherein the second thickness is greater than the first thickness and further comprising a flow drill screw extending through the second section of the extrusion.

2. A product as set forth in claim 1 wherein the first thickness is 1.5 mm or greater and wherein the second thickness is 2.0 mm or greater.

3. A product as set forth in claim 1 wherein the extrusion has a generally tubular shape.

4. A product as set forth in claim 1 wherein the extrusion includes a top wall portion and an opposite bottom wall portion, a first side wall portion and an opposite second side wall portion wherein the wall portions are connected together.

5. A product as set forth in claim 1 further comprising a first sheet of material and a flow drill screw extending through the first sheet and the extrusion.

6. A product as set forth in claim 1 further comprising a first sheet of material adhered to the extrusion with an adhesive layer positioned there between and a flow drill screw extending through the first sheet, adhesive layer and the extrusion.

7. A product as set forth in claim 3 wherein the second section extends in the axial direction of the generally tubular shaped extrusion.

8. A product as set forth in claim 1 wherein the extrusion has a generally tubular shape including a top wall portion and an opposite bottom wall portion, a first side wall portion and an opposite second side wall portion, wherein the second section is part of a first side wall portion, and the extrusion including a third section having a third thickness and a fourth section having a fourth thickness, and wherein the fourth thickness is greater than the third thickness and wherein the fourth section is part of the second side wall portion, and further comprising a first sheet having a portion positioned overlying the fourth section and a flow drill screw extending through the first sheet and the fourth section, and a second sheet overlying the second section and a flow drill screw extending through the second sheet and the second section.

9. A product as set forth in claim 8 wherein each of the first section and third section has a thickness of 1.5 mm or greater and wherein each of the second section and fourth section has a thickness of 2.0 mm or greater.

10. A product as set forth in claim 8 further comprising an adhesive layer interposed between the first sheet and the fourth section, and an adhesive layer interposed between the second sheet and the second section.

11. A product as set forth in claim 8 wherein the extrusion is a vehicle seat back beam.

12. A product as set forth in claim 11 wherein the second sheet is a vehicle seat back panel.

13. A product as set forth in claim 11 wherein the first sheet is constructed and arranged to provide an interior trim component.

14. A method comprising:
provinding a product comprising: a vehicle structural component comprising an extrusion having a first section having a first thickness and a second section having a second thickness and wherein the second thickness is greater than the first thickness;
attaching a first sheet of material to the extrusion comprising inserting a flow drill screw through the first sheet of material and the second section.

15. A method as set forth in claim 14 further comprising adhering the first sheet of material to the extrusion with a layer of adhesive prior to the inserting the flow drill screw through the first sheet of material and the first section.

16. A method as set forth in claim 14 wherein extrusion further includes a third section having a third thickness and a fourth section having a fourth thickness and wherein the fourth thickness is greater than the third thickness, and further comprising attaching a second sheet of material to the extrusion comprising inserting a flow drill screw through the second sheet of material and the fourth section.

17. A method as set forth in claim 14 wherein the extrusion is a vehicle seat back beam.

18. A method as set forth in claim 16 the second sheet is a vehicle seat back panel.

19. A method as set forth in claim 14 wherein the first sheet is constructed and arranged to provide an interior trim component.

* * * * *